June 26, 1945.    A. P. GUBRUD    2,379,350
GRADE INDICATOR
Filed April 13, 1944    2 Sheets-Sheet 1
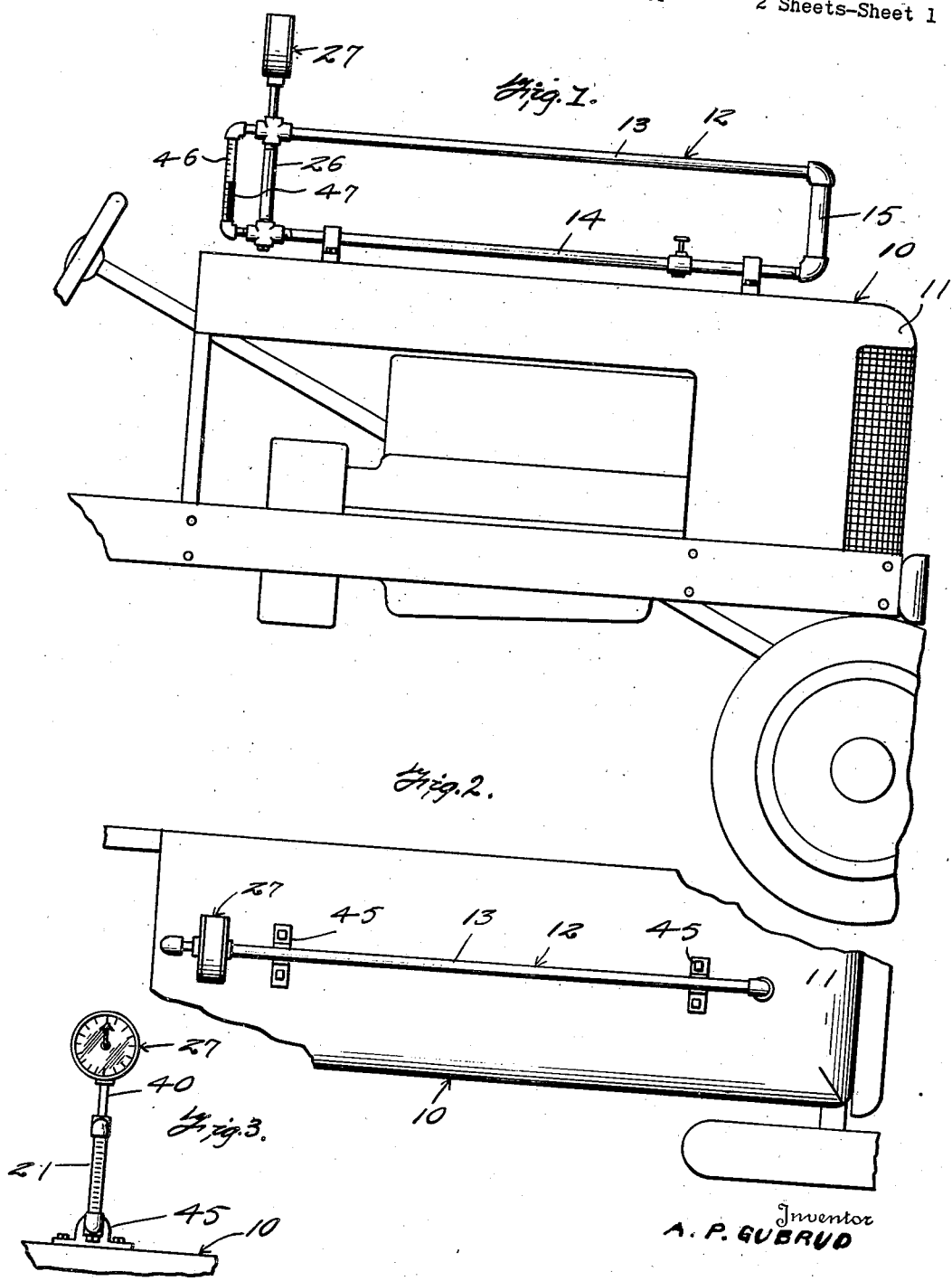
Inventor
A. P. GUBRUD
By Kimmel & Crowell
Attorneys June 26, 1945.   A. P. GUBRUD   2,379,350
GRADE INDICATOR
Filed April 13, 1944   2 Sheets-Sheet 2
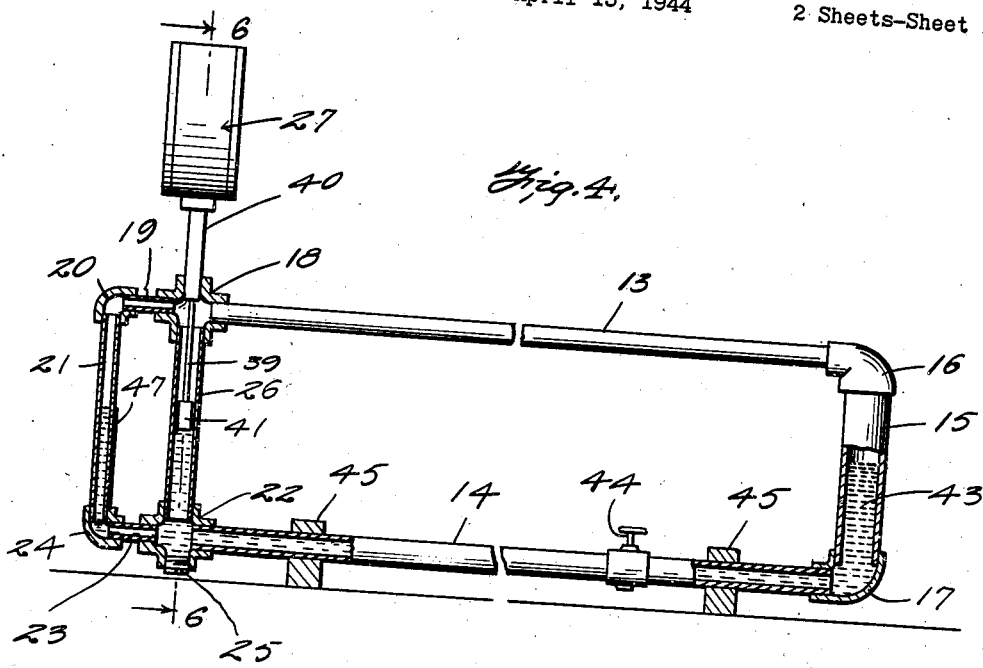
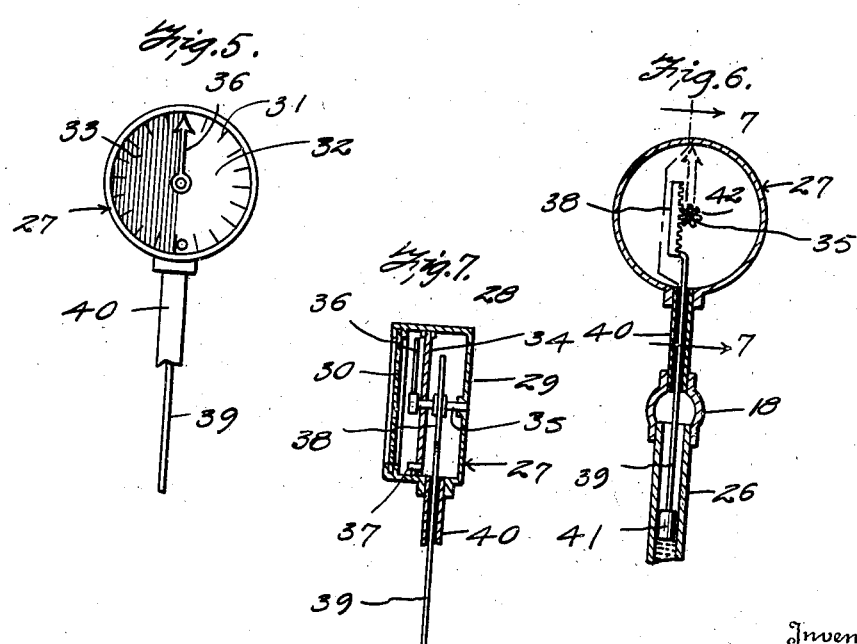
Inventor
A. P. GUBRUD
By Kimmel & Crowell
Attorneys Patented June 26, 1945

2,379,350

UNITED STATES PATENT OFFICE 2,379,350

GRADE INDICATOR

Adolph P. Gubrud, Hudson, S. Dak.

Application April 13, 1944, Serial No. 530,896

3 Claims. (Cl. 33—209)

This invention relates to a level determining device for mounting on a vehicle so as to determine the grade of a road or other surface.

An object of this invention is to provide a device of this kind which can be readily mounted on any convenient part of the vehicle, and which embodies the use of a fluid in a closed channel, the fluid operating a gauge or meter whereby the driver can determine the various grades of the ground as he passes thereover.

Another object of this invention is to provide a device of this kind which is simple in construction and will not get out of order.

A further object of this invention is to provide in a device of this kind means whereby the level determining fluid will be prevented from surging or undue agitation over rough road or other conditions.

With the foregoing and other objects in view, the invention will be more fully described hereinafter, and will be more particularly pointed out in the claims appended hereto.

In the drawings wherein like symbols refer to like or corresponding parts throughout the several views, Figure 1 is a detailed side elevation of a device constructed according to an embodiment of this invention mounted on a vehicle, the vehicle being shown in fragmentary form.

Figure 2 is a top plan of the device on the vehicle.

Figure 3 is a rear elevation of the device.

Figure 4 is an enlarged detailed side elevation partly in section of the device.

Figure 5 is an enlarged rear elevation of the meter.

Figure 6 is a sectional view, taken on the line 6—6 of Figure 4.

Figure 7 is a sectional view, taken on the line 7—7 of Figure 6.

Referring to the drawings the numeral 10 designates generally a vehicle, which in the present instance is a tractor, having a hood 11 on which a level determining device 12, constructed according to an embodiment of this invention is mounted.

The level determining device 12 is an endless tube, and comprises upper and lower pipes 13 and 14, a vertical forward pipe 15 secured to the forward ends of the upper and lower pipes by means of L's 16 and 17. The upper pipe 13, at the rear end thereof, has secured thereto a four-way coupling 18 and a reduced diameter nipple 19 extends from one branch of the coupling 18. An L 20 is secured to the rear end of the nipple 19, and the upper end of a glass gauge 21 is mounted in the L 20.

A four-way coupling 22 is secured to the rear end of the lower pipe 14, and has mounted in one branch thereof a reduced diameter nipple 23. An L 24 is mounted on the rear end of the nipple 23 and the lower end of the glass tube or gauge 21 is mounted in the L 24. The coupling 22 has a plug 25 mounted in the lower branch thereof whereby the tubular member forming the gauge may be filled with liquid to the desired level.

The coupling 18 has mounted in another branch thereof one end of a pipe 26, and the other end of the pipe 26 is mounted in the upper branch of the coupling 22. The pipe 26 is parallel with the gauge 21 and spaced forwardly therefrom.

A meter housing, generally designated as 27, is disposed above the upper pipe 13, and comprises a cylindrical body 28 having a forward wall 29 and a transparent panel 30, forming the rear wall. The panel 30 is provided with a plurality of graduations 31, and preferably the panel 30 is provided with one-half 32 thereof clear and the other half 33 of a contrasting color.

An inner wall 34 is mounted in the housing 27 and a pointer shaft 35 is journaled in the wall 34 and also the forward wall 29. A pointer 36 is secured to the rear end of the shaft 35 and is positioned between the transparent dial or wall 30 and the inner wall 34. The wall 34 has secured to the lower portion thereof, a stop pin 37 against which the pointer 36 is adapted to engage so as to limit the swinging of the pointer 36 to 180° in either direction.

The shaft 35 is adapted to be rotated by means of a vertically movable rack 38 which is positioned within the housing 27, and is secured to a rod or stem 39. The rod or stem 39 extends downwardly through a pipe 40 extending from the housing 27 and mounted in the upper branch of the coupling 18. The rod 37 extends downwardly into the pipe 26 and has secured to the lower end thereof a float 41. The rack 38 meshes with a pinion 42 mounted on the shaft 35 so that vertical movement of the rack 38 will rotate the shaft 35 and swing the pointer 36 about the inner side of the dial 30.

In order to provide a means whereby the liquid 43 within the endless tube hereinbefore described will be prevented from undue agitation or surging, I have provided a valve 44 which is interposed in the pipe 14. The valve 44, when moved to a partly closed position will limit the movement of the liquid within the lower pipe 14 and will thereby limit the vertical movement of the liquid within the pipe 26, this latter pipe being the float guide for operating the pointer.

The gauge structure hereinbefore described is adapted to be mounted at any suitable point and in the present instance is mounted on the hood 11 of the tractor being secured thereto by means of a pair of clamping members 45. The pipes 13 and 14 are of a length slightly less than the length of the hood 11 and preferably the glass tube 21 is provided on the rear side thereof with graduations 46 so that the degree of inclination of the ground can be determined by the level of the liquid in the glass tube 21, and can also be determined by the position of the pointer 36 with respect to the dial 30.

In order to facilitate the reading of the graduations 46 on glass tube 21, the rear portion of this tube is provided with a colored coating 47 which extends upwardly from the lower end of this tube and terminates in the vertical center, at which point "0" graduation is positioned. The graduations 46 are preferably indicative of one percent difference in level for each graduation above or below the central graduation. The rise or fall of liquid in tube 21 is made as great as possible by providing vertical pipe 15 of greater diameter than tube 21. Graduations 31 on dial 32 are preferably arranged in fractions of one percent so that swinging of pointer 36 from the upper vertical position which is "0" to the lower vertical position will indicate a rise or fall of ground level of one percent. Where the inclination of the ground is greater or lesser than one percent the reading will be taken from graduations 46 on tube 21.

In the use of this device, the tubular member 12 is mounted on the hood 11 with the gauge 21 and the pipe 15 in a vertical position, and with the upper and lower pipes 13 and 14 parallel with the frame or chassis of the vehicle. The liquid 43 is preferably a colored liquid so that the position of the liquid in the gauge tube 21 can be readily viewed. As the vehicle moves over the surface of the ground the pointer 36 will swing either in a clockwise or counterclockwise direction, depending on the inclination of the ground, and by providing the contrasting color on one-half of the dial 30, the operator can determine by a glance of the meter 27 whether the inclination is up or down. Where the inclination is under one percent, the degree of inclination is read on meter. Where the inclination is greater than one percent, pointer 36 will stop at its lowermost position by contacting with the stop 37, but liquid 43 will move up or down in gauge tube 21, depending upon whether the grade is up or down, and the level of liquid 43 in tube 21 will indicate the correct inclination, each graduation 46 representing one percent.

The device is of simple construction and will not readily get out of order, and if desired the various graduations may be in percentages or fractions of percentages so that a record may be accurately kept of the inclination of different portions of the ground.

What is claimed is:

1. A grade indicator comprising an endless tubular member formed of horizontal elongated tubes, a pair of vertical tubes connecting the ends of said horizontal together, a liquid in said endless member, an intermediate vertical tube communicating at the opposite ends thereof with said horizontal tubes, a gauge, a nipple connecting said gauge with one of said horizontal tubes in alignment with said intermediate tube, and a vertically movable float movable in said intermediate tube and connected to said gauge in a manner to indicate different levels of the liquid in the intermediate tube resulting from different angular positions imparted to the indicator.

2. A grade indicator comprising an endless tubular member formed of horizontal elongated tubes, a pair of vertical tubes connecting the ends of said horizontal together, one of said vertical tubes being transparent and of smaller diameter, graduations of predetermined spacing on said one vertical tube, a liquid in said endless member, an intermediate vertical tube communicating at the opposite ends thereof with said horizontal tubes, a gauge, a nipple connecting said gauge with one of said horizontal tubes in alignment with said intermediate tube, and a vertically movable float movable in said intermediate tube and connected to said gauge in a manner to indicate different levels of the liquid in the intermediate tube resulting from different angular positions imparted to the indicator, said gauge being adapted to indicate slight variations in the rise or fall along a horizontal plane to any degree less than the spacing of adjacent graduations on the vertical tube by which greater variations are indicated.

3. A grade indicator comprising an endless tubular member formed of horizontal elongated tubes, a pair of vertical tubes connecting the ends of said horizontal together, a liquid in said endless member, an intermediate vertical tube communicating at the opposite ends thereof with said horizontal tubes, a gauge, a nipple connecting said gauge with one of said horizontal tubes in alignment with said intermediate tube, a vertically movable float movable in said intermediate tube and connected to said gauge in a manner to indicate different levels of the liquid in the intermediate tube resulting from different angular positions imparted to the indicator, and an adjustable valve member disposed in the lower horizontal tube for varying the flow of liquid through the latter whereby agitation or surging is prevented.

ADOLPH P. GUBRUD.